(12) United States Patent
Davis et al.

(10) Patent No.: US 9,393,990 B2
(45) Date of Patent: Jul. 19, 2016

(54) VEHICLE GUIDANCE SYSTEM

(71) Applicant: Topcon Precision Agriculture Pty Ltd, Mawson Lakes (AU)

(72) Inventors: Andrew Davis, Erindale (AU); Ivan Di Federico, Argenta (IT); Rhett Schildroth, North Liberty, IA (US)

(73) Assignee: Topcorn Precision Agriculture Pty Ltd., Mawson Lakes (AU)

( * ) Notice: Subject to any disclaimer, the term of this patent is extended or adjusted under 35 U.S.C. 154(b) by 0 days.

(21) Appl. No.: 14/521,090

(22) Filed: Oct. 22, 2014

(65) Prior Publication Data

US 2015/0041238 A1 Feb. 12, 2015

Related U.S. Application Data

(62) Division of application No. 13/375,735, filed as application No. PCT/AU2010/000683 on Jun. 2, 2010, now Pat. No. 8,892,308.

(30) Foreign Application Priority Data

Jun. 2, 2009 (AU) ................................ 2009902536

(51) Int. Cl.
*A01B 69/00* (2006.01)
*B62D 5/04* (2006.01)
(Continued)

(52) U.S. Cl.
CPC ............ *B62D 5/0487* (2013.01); *A01B 69/008* (2013.01); *B62D 1/28* (2013.01); *B62D 1/286* (2013.01); *B62D 5/04* (2013.01); *B62D 5/0415* (2013.01); *B62D 1/00* (2013.01)

(58) Field of Classification Search
CPC ........ B62D 5/0487; B62D 1/28; B62D 1/286; B62D 5/04; B62D 5/0415; A01B 69/008
See application file for complete search history.

(56) References Cited

U.S. PATENT DOCUMENTS 2,728,463 A 12/1955 Beckwith
2,761,569 A 9/1956 Iserman
(Continued)

FOREIGN PATENT DOCUMENTS

DE 2925156 B1 9/1980
DE 3200241 8/1983
(Continued)

OTHER PUBLICATIONS

International Search Report and Written Opinion mailed on May 27, 2010, in connection with International Patent Application No. PCT/AU2010/000068 (13 pages).
(Continued)

*Primary Examiner* — Calvin Cheung
(74) *Attorney, Agent, or Firm* — Chiesa Shahinian & Giantomasi PC

(57) ABSTRACT

A vehicle guidance system is disclosed where the vehicle includes a steering wheel assembly including a steering wheel and a hub, the hub connected to a steering shaft rotatable about a steering wheel axis within a steering column for steering the vehicle. The vehicle guidance system includes a receiver for receiving a position indication signal, a steering controller for generating a steering control signal based on the position indication signal and a drive assembly to directly drive the steering wheel assembly responsive to the steering control signal. The drive assembly generates a torque about a drive axis to rotate the steering wheel assembly, wherein the drive axis of the drive assembly is coaxial to the steering wheel axis.

11 Claims, 5 Drawing Sheets

(51) Int. Cl.
*B62D 1/28* (2006.01)
*A01B 69/04* (2006.01)
*B62D 1/00* (2006.01)

(56) References Cited

U.S. PATENT DOCUMENTS

| | | | |
|---|---|---|---|
| 3,643,981 A | 2/1972 | Grandel et al. | |
| 3,648,539 A | 3/1972 | Rouis | |
| 4,453,485 A | 6/1984 | Houghton-Brown et al. | |
| 4,492,253 A | 1/1985 | Raftis | |
| 4,515,221 A | 5/1985 | van der Lely | |
| 4,527,444 A | 7/1985 | McKee et al. | |
| 4,527,656 A | 7/1985 | Walbridge | |
| 4,657,087 A | 4/1987 | Livneh | |
| 4,681,055 A | 7/1987 | Cyr | |
| 4,691,587 A | 9/1987 | Farrand et al. | |
| 4,892,330 A | 1/1990 | Beauch | |
| 4,990,066 A | 2/1991 | Kern | |
| 4,993,279 A | 2/1991 | Doescher et al. | |
| 5,052,715 A | 10/1991 | Ervin et al. | |
| 5,085,106 A | 2/1992 | Bubnash | |
| 5,121,799 A | 6/1992 | Barnes et al. | |
| 5,211,258 A | 5/1993 | Wibom | |
| 5,285,867 A | 2/1994 | Pedersen et al. | |
| 5,452,917 A | 9/1995 | Fujiu et al. | |
| 5,509,497 A | 4/1996 | Smith | |
| 5,573,273 A | 11/1996 | Ito | |
| 5,728,004 A | 3/1998 | Dziegielewski | |
| 5,737,971 A | 4/1998 | Riefe et al. | |
| 5,835,870 A | 11/1998 | Kagawa | |
| 5,941,917 A | 8/1999 | Barnes et al. | |
| 6,029,768 A | 2/2000 | Kiyosawa | |
| 6,053,270 A | 4/2000 | Nishikawa et al. | |
| 6,059,068 A | 5/2000 | Kato et al. | |
| 6,134,983 A | 10/2000 | Armstrong et al. | |
| 6,205,882 B1 | 3/2001 | Jolley | |
| 6,279,951 B1 | 8/2001 | Cartwright et al. | |
| 6,345,842 B1 | 2/2002 | Igarashi et al. | |
| 6,374,167 B2 | 4/2002 | Iwazaki | |
| 6,585,005 B1 | 7/2003 | Raftis et al. | |
| 6,591,709 B1 | 7/2003 | Kim et al. | |
| 6,653,808 B2 * | 11/2003 | Inagaki | B60L 11/1807 318/268 |
| 6,953,059 B2 | 10/2005 | Raftis | |
| 6,988,583 B2 | 1/2006 | Turner | |
| 7,182,353 B2 | 2/2007 | Divers | |
| 7,188,015 B2 | 3/2007 | Lange et al. | |
| 7,349,779 B2 | 3/2008 | Nelson | |
| 7,350,806 B2 | 4/2008 | Ridolfi et al. | |
| 7,360,623 B2 | 4/2008 | Green et al. | |
| 7,445,028 B1 | 11/2008 | Aanonsen et al. | |
| 7,509,887 B2 | 3/2009 | Maida et al. | |
| 7,526,372 B2 * | 4/2009 | Tsutsumi | B62D 5/003 180/405 |
| 7,854,293 B2 | 12/2010 | Derby et al. | |
| 2001/0000592 A1 | 5/2001 | Estes et al. | |
| 2003/0171721 A1 | 9/2003 | Enomoto et al. | |
| 2004/0023746 A1 | 2/2004 | Arihara | |
| 2004/0206570 A1 | 10/2004 | Tajima et al. | |
| 2004/0210357 A1 | 10/2004 | McKay et al. | |
| 2005/0016314 A1 | 1/2005 | Kinme et al. | |
| 2005/0284251 A1 | 12/2005 | Inayoshi et al. | |
| 2005/0288834 A1 | 12/2005 | Heiniger et al. | |
| 2006/0015228 A1 | 1/2006 | Lange | |
| 2006/0015229 A1 | 1/2006 | Lange et al. | |
| 2006/0116798 A1 | 6/2006 | Gibson et al. | |
| 2006/0156856 A1 | 7/2006 | Camp | |
| 2006/0200290 A1 | 9/2006 | Chino et al. | |
| 2006/0266151 A1 | 11/2006 | Avers et al. | |
| 2006/0282205 A1 | 12/2006 | Lange | |
| 2007/0170711 A1 | 7/2007 | Bechtel et al. | |
| 2007/0225883 A1 | 9/2007 | Maeda et al. | |
| 2008/0134827 A1 | 6/2008 | Jo | |
| 2008/0141814 A1 | 6/2008 | Markfort | |
| 2008/0264714 A1 | 10/2008 | Morikawa | |
| 2009/0019963 A1 | 1/2009 | Hubrecht et al. | |
| 2009/0020995 A1 | 1/2009 | Kim | |
| 2009/0256342 A1 | 10/2009 | Cymbal et al. | |
| 2011/0210536 A1 | 9/2011 | Monteil et al. | |
| 2012/0006142 A1 | 1/2012 | Jung | |
| 2012/0024617 A1 | 2/2012 | Markfort et al. | |
| 2012/0312626 A1 | 12/2012 | Hosomi et al. | |
| 2013/0032430 A1 | 2/2013 | Zaloga et al. | |
| 2013/0174684 A1 | 7/2013 | Burns | |
| 2014/0236501 A1 * | 8/2014 | Mao | G01R 31/343 702/58 |

FOREIGN PATENT DOCUMENTS

| | | |
|---|---|---|
| DE | 4101810 A1 | 7/1992 |
| DE | 9314133 U1 | 11/1993 |
| DE | 102004024686 A1 | 12/2005 |
| DE | 102006055774 A1 | 5/2008 |
| EP | 802105 A2 | 10/1997 |
| EP | 1683704 A2 | 7/2006 |
| EP | 1985520 A1 | 10/2008 |
| FR | 2 686 432 | 7/1993 |
| GB | 2346198 | 8/2000 |
| JP | 2006-312421 | 11/2006 |
| WO | 2004070125 | 8/2004 |
| WO | 2007009420 A1 | 1/2007 |
| WO | 2008134808 | 11/2008 |

OTHER PUBLICATIONS

Extended European Search Report issued on Jul. 8, 2014, in connection with European Patent Application No. 10782827.9, 10 pgs.

* cited by examiner

VEHICLE GUIDANCE SYSTEM

CLAIM OF PRIORITY

The present application for patent is a division of U.S. patent application Ser. No. 13/375,735, having an international filing date of Jun. 2, 2010, which is a 35 U.S.C. 371 filing of International Application PCT/AU2010/000683, filed Jun. 2, 2010 which claims priority from Australian Provisional Patent Application No. 2009902536 entitled "VEHICLE GUIDANCE SYSTEM", filed Jun. 2, 2009, all of which are hereby expressly incorporated by reference herein in their entirety.

TECHNICAL FIELD

The present invention relates to a vehicle guidance system for guiding the motion of a vehicle. In a particular form, the present invention relates to a vehicle guidance system operative on the steering assembly of a vehicle.

BACKGROUND

Agricultural operations such as harvesting, sowing, spraying and seeding can benefit greatly by having the relevant vehicle such as a harvester, tractor or sprayer following a precise path in order to minimise overlap and/or to allow precise placement with respect to previous operations. These operations are often conducted over terrain which may be undulating or have locally varying characteristics which can affect the operation of the vehicle. As such, vehicle guidance systems have been adopted to guide these vehicles especially for large scale farming where extensive tracts of land are involved or where very precise placement of the implement or machinery can be of value. These systems ensure that the land is traversed by the vehicle in the most efficient manner following an optimised predetermined path as manual operation of an agricultural vehicle may result in gaps or the non optimal use of fuel or agricultural materials.

Typically, these vehicle guidance systems will involve the reception of a position indication signal which allows a receiver located on the vehicle to determine its position. Commonly, the position indication signal is taken from a Global Navigation Satellite System (GNSS) satellite based positioning system such as the American Global Positioning System (GPS) and/or the Russian GLONASS System and/or the European Galileo system signal or the more accurate differential satellite signal. This allows a satellite receiver located on the vehicle to determine the vehicle's absolute position. In more precise applications, the guidance system may also include gyroscopes, a compass and accelerometers located on the vehicle. This also allows the guidance system to infer more accurately the position of the towed implement as opposed to the position of the GNSS antenna which is typically mounted on the vehicle roof and so subject to extra movements of the vehicle as it passes over the terrain. It also allows guidance to continue when there is a temporary interruption to the satellite signal.

Alternatively, the position indication signal may be based on a network of local radio transmitters so that a vehicle can determine its relative position with respect to a number of fixed reference points by triangulation or other means. In another alternative, the position indication signal may be a control signal indicating in which direction the vehicle should be moving. Based on the position indication signal, a steering control signal is then generated which controls the vehicle steering system to follow the predetermined path.

In one example, the steering control signal is linked into an additional hydraulic valve that has been incorporated into the steering system of the vehicle which directly drives the mechanical steering assembly of the vehicle. In many instances, systems of this type will involve substantial retrofitting and modification of the hydraulic steering system which, as well as involving a significant added expense to the vehicle, will also further complicate the hydraulic steering system. This can lead to associated maintenance and reliability issues due to the added complexity of the additional fitted control system and its associated components. In addition, systems of this type offer no portability between different types of vehicles which may require a vehicle guidance system as modifications made will be specific to each type of vehicle.

Other examples of vehicle guidance systems are directed more closely to the manual operable portion of the steering assembly by either driving the steering shaft or indirectly actuating the steering wheel by a remote drive which is then coupled to the steering wheel of the vehicle. Examples of these remotely coupled systems include a belt or chain drive arrangement incorporating a separate standalone motor which drives a pulley or chain connected to the steering wheel. Another example includes a ring gear arrangement where a separate standalone motor drives a ring gear mounted to the steering wheel. In another example, the coupling between the separate motor and the steering wheel is by frictional engagement with the periphery of the steering wheel. In yet another example, a worm gear arrangement is employed to couple the standalone motor to the steering wheel.

All of these examples which attempt to actuate the steering wheel involve some modification to the standard manually operable steering assembly of a vehicle. Accordingly, these systems can be expensive and time consuming to both install and remove. Another important disadvantage of these systems is that they are inherently limited in how rapidly they are able to turn the steering assembly. This is turn limits the speed at which steering corrections to the direction of the vehicle can be achieved resulting in overall reduced accuracy and impacting on the maximum vehicle speed that a vehicle can be operated. Also, as space is often at a premium in the cabin of a vehicle, these systems have the added disadvantage of the motor and coupling arrangements occupying extra room within the vehicle which can present a safety hazard. Another related disadvantage is that the motor and coupling arrangements result in extra environmental noise in the cabin of the vehicle.

There is therefore a need for a vehicle guidance system that is capable of being conveniently fitted to the steering system of a vehicle in a simple and more cost effective manner. There is similarly, a need for a vehicle guidance system capable of supplying sufficient torque to the steering mechanism to provide accurate control over a range of vehicle speeds. There is also a need for a vehicle guidance system that does not otherwise impact upon the operator of the vehicle.

SUMMARY

In a first aspect the present invention accordingly provides a vehicle guidance system for a vehicle, the vehicle including a steering wheel assembly including a steering wheel and a hub, the hub connected to a steering shaft rotatable about a steering wheel axis within a steering column for steering the vehicle, the vehicle guidance system including:

a receiver for receiving a position indication signal;

a steering controller for generating a steering control signal based on the position indication signal;

a drive assembly to directly drive the steering wheel assembly responsive to the steering control signal, the drive assembly operable to generate a torque about a drive axis to rotate the steering wheel assembly, wherein the drive axis of the drive assembly is coaxial to the steering wheel axis.

In another form, the drive assembly directly drives the hub of the steering wheel assembly to rotate the steering wheel assembly.

In another form, the drive assembly is located adjacent to the hub of the steering wheel.

In another form, the drive assembly is located below the hub of the steering wheel.

In another form, the drive assembly is integrated into the hub of the steering wheel.

In another form, the drive assembly includes an electric motor, the electric motor including a housing, a stator element and a rotor element rotatable within the housing about the drive axis.

In another form, the rotor element is connected to the hub of the steering wheel assembly.

In another form, the drive assembly includes an anti-rotation member for providing a steering reaction torque.

In another form, the anti-rotation member connects the drive assembly to the steering column of the vehicle.

In another form, the steering wheel assembly and drive assembly are removable as a unit from the steering shaft.

In a second aspect the present invention accordingly provides a drive assembly for directly driving a steering wheel assembly, the steering wheel assembly including a steering wheel and a hub, the hub connected to a steering shaft rotatable about a steering wheel axis within a steering column for steering the vehicle, wherein the drive assembly generates a torque about a drive axis to rotate the steering wheel assembly and wherein the drive axis of the drive assembly is coaxial to the steering wheel axis.

In another form, the drive assembly directly drives the hub of the steering wheel assembly to rotate the steering wheel assembly.

In a third aspect the present invention accordingly provides a method of disengaging a drive assembly in a vehicle guidance system, the vehicle guidance system operable on a steering wheel assembly including a steering wheel and a hub, the hub connected to a steering shaft rotatable about a steering wheel axis within a steering column for steering the vehicle and the drive assembly operable to generate a torque about a drive axis to rotate the steering wheel assembly, wherein the drive axis of the drive assembly is coaxial to the steering wheel axis, the method including the steps of:

commanding the drive assembly to achieve a prescribed value of a performance parameter;

monitoring the drive assembly to determine an actual value of the performance parameter;

determining a difference measure between the prescribed value and the actual value and disengaging the drive assembly based on the difference measure.

In another form, the drive assembly includes an electric motor.

In another form, the performance parameter is electric motor speed.

In another form, the performance parameter is a direction of rotation of the electric motor.

In another form, the performance parameter is electric motor torque.

In another form, the performance parameter is electric motor position.

In another form, the performance parameter is steered wheel angle position.

In another form, the performance parameter is the position of the vehicle.

In another form, the commanded performance parameter and the monitored performance parameter are different.

In another form, the commanded performance parameter is a direction of applied torque and the monitored performance parameter is an acceleration of the electric motor.

In another form, the difference measure is evaluated over a predetermined time period.

In a fourth aspect the present invention accordingly provides a vehicle guidance system for a vehicle, the vehicle including a steering wheel assembly having a steering wheel connected to a steering shaft, the steering shaft rotatable within a steering column about a steering axis for steering the vehicle, the vehicle guidance system including:

a receiver for receiving a position indication signal;

a wheel angle sensor to determine a vehicle wheel direction, the vehicle wheel direction being steered by the steering wheel assembly;

a steering controller for generating a steering control signal based on the position indication signal and the vehicle wheel direction;

a drive assembly to directly drive the steering wheel assembly responsive to the steering control signal.

In a fifth aspect the present invention accordingly provides a vehicle guidance system for a vehicle, the vehicle including a steering wheel assembly including a steering wheel and a hub, the hub connected to a steering shaft rotatable about a steering wheel axis within a steering column for steering the vehicle, the vehicle guidance system including:

a receiver for receiving a position indication signal;

a wheel angle sensor to determine a steered wheel angle of the vehicle;

a steering controller for generating a steering control signal based on the position indication signal; and a drive assembly to directly drive the steering wheel assembly responsive to the steering control signal.

In another form, the drive assembly is operable to generate a torque about a drive axis to rotate the steering wheel assembly and wherein the drive axis of the drive assembly is coaxial to the steering wheel axis.

In a sixth aspect the present invention accordingly provides an integrated drive assembly and steering wheel assembly for a vehicle, the steering wheel assembly including a steering wheel and a hub, the hub connected to a steering shaft rotatable about a steering wheel axis within a steering column for steering the vehicle, the drive assembly for directly driving the steering assembly by generating a torque about a drive axis to rotate the steering wheel assembly, wherein the drive axis of the drive assembly is coaxial to the steering wheel axis and wherein a physical characteristic of the steering wheel assembly is matched to the drive assembly.

In another form, the physical characteristic of the steering wheel assembly is its inertial characteristics.

BRIEF DESCRIPTION OF THE DRAWINGS

Illustrative embodiments of the present invention will be discussed with reference to the accompanying drawings wherein.

In the following description, like reference characters designate like or corresponding parts throughout the several views of the drawings.

DETAILED DESCRIPTION

Figure 1:
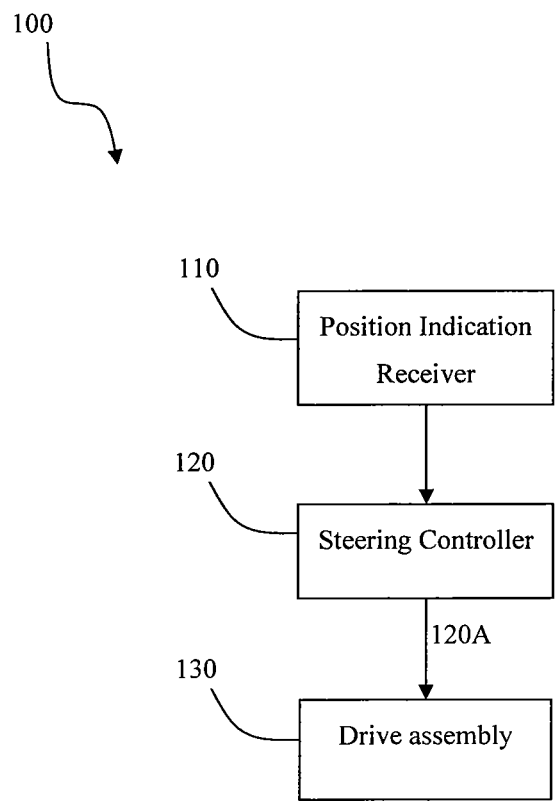
FIG. 1 is a system overview diagram of a vehicle guidance system in accordance with an illustrative embodiment of the present invention.

Referring now to FIG. 1, there is shown a system overview diagram of a vehicle guidance system 100 according to an illustrative embodiment. While the various illustrative embodiments referred to herein are described with respect to agricultural vehicles it will be apparent that the present invention may be applied to any type of vehicle that is required to be guided according to a position indication signal.

In one embodiment, the position indication signal may be operative to guide the vehicle to travel along a predetermined path such as in the case of a harvester. Alternatively, in another embodiment the position indication signal may come from a remote control unit operative to remotely steer the vehicle. Some other types of vehicles where the present invention may find application include, but are not limited to, heavy vehicles that are used in construction, road building and mining such as diggers, trenchers, graders and bulldozers.

Vehicle guidance system 100 includes a position indication receiver 110 for receiving a position indication signal, a steering controller 120 for generating a steering control signal 120A and a drive assembly 130 for interacting with the vehicle's standard steering wheel assembly to steer the vehicle. In this illustrative embodiment, position indication receiver 110 is a GNSS receiver as is known in the art and would be typically installed on the roof of the cabin of the vehicle.

Steering controller 120 generates in this embodiment a steering control signal 120A based on the location of the vehicle as determined by position indication receiver 110 and a predetermined path entered into the steering controller 120. The predetermined path may be directly uploaded to the steering controller in a data file or alternatively be entered via an operator console accepting instructions from the operator of the vehicle. In one example, the vehicle may be a harvester for harvesting a cereal crop and the predetermined path relates to a path with minimal overlap and optimised for fuel efficiency that the vehicle will travel in a harvesting session. In another embodiment, where the position indication signal includes remote steering signals from a remote steering unit the steering control signal 120A will be based directly on the position indication signal to remotely steer the vehicle. Based on the steering control signal, drive assembly 130 operates to directly drive the hub of the steering wheel to steer the vehicle.

Figure 2:
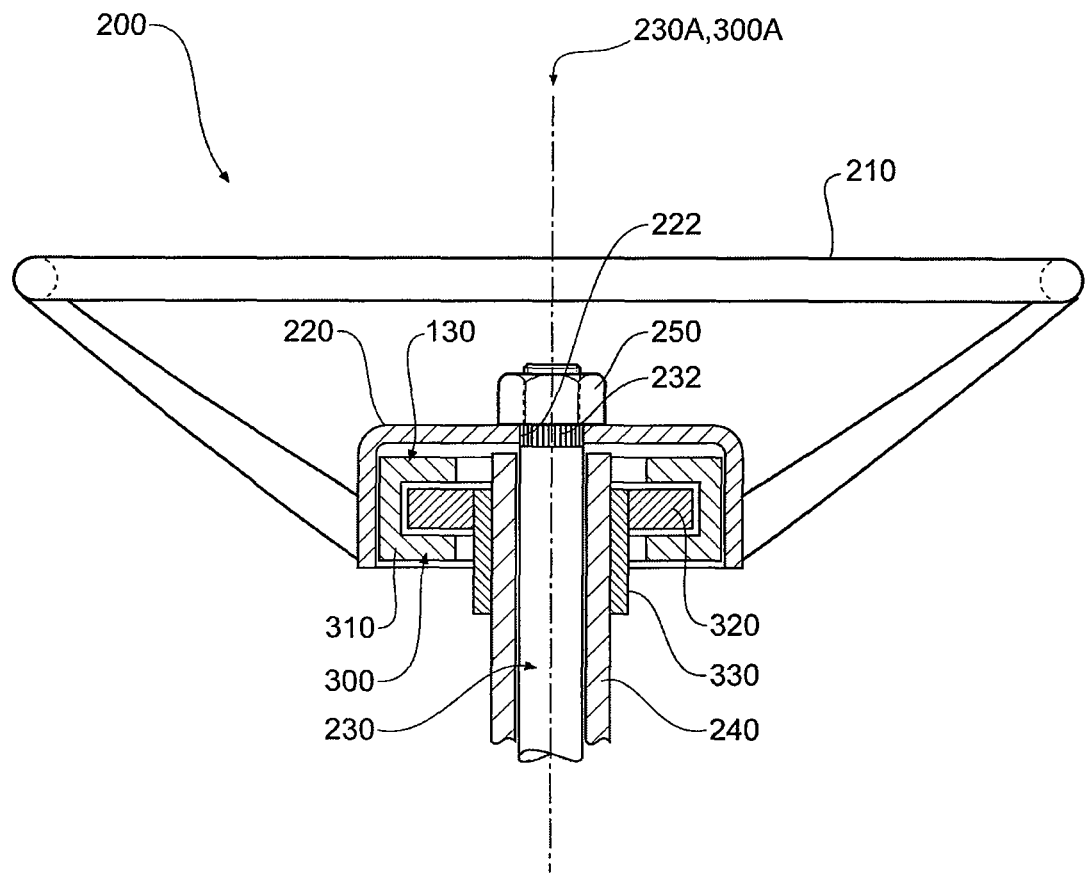
FIG. 2 is a sectional view of a drive assembly forming in an illustrative embodiment a component of the vehicle guidance system illustrated in FIG. 1.

Referring now to FIG. 2, there is shown a sectional view of a drive assembly 130 according to an illustrative embodiment which drives the steering wheel assembly 200 which consists of a steering wheel 210 and a centrally located hub 220. Hub 220 is fastened to steering shaft 230 by a connecting nut 250 with the torque transferred by a spline surface 232 located on steering shaft 230 and a complementary spline surface 222 located on hub 220. In standard manual steering mode, an operator manually turns the steering wheel 210 which in turn rotates the hub 220 about a steering wheel axis 230A. This in turn rotates steering shaft 230 which is rotatable within steering column 240 and is connected to the steering assembly of the vehicle which in the case of an agricultural vehicle will typically be a hydraulic based system.

Drive assembly 130 includes a motor 300 integrated within the hub 220 of steering wheel 210 which functions to directly drive the steering wheel assembly 200 by driving the hub 220 with respect to the steering column 240. Motor 300 includes a rotor element 310 that is attached to the internal periphery of hub 220 and a centrally located stator element 320 which is also located within the hub 220 of steering wheel 210. Stator element 320 is fixed to the steering column 240 by adaptor sleeve 330 or anti-rotation member which is attached to steering column 240. In this manner, when a current is applied to motor 300 in accordance with a steering control signal 120A the rotor element 310 will rotate about a drive axis 300A with respect to stator 320 which is coaxial to steering axis 230A, thereby generating a torque about the drive axis 300A which functions to turn steering wheel hub 220 and the steering wheel shaft 230.

Vehicle guidance system 100 incorporating drive assembly 130 provides a number of substantial advantages over prior art guidance systems. One advantage is the simple fitting of drive assembly 130 as the motor is located as part of the hub 220 of steering wheel assembly 200. Accordingly, the drive assembly 130 may be installed as an integral one piece unit by sliding adaptor sleeve 330 over steering column 240, fixing adaptor sleeve 330 to steering column 240 and attaching hub 220 to steering shaft 230 by connecting nut 250. Similarly, drive assembly 130 may be easily removed by simply reversing this process and allowing a standard steering wheel to be refitted as required. This is to be contrasted with prior art systems which involve indirectly coupling a separate motor with the steering wheel whether by a belt drive, worm gear or ring gear arrangement.

Figure 3:
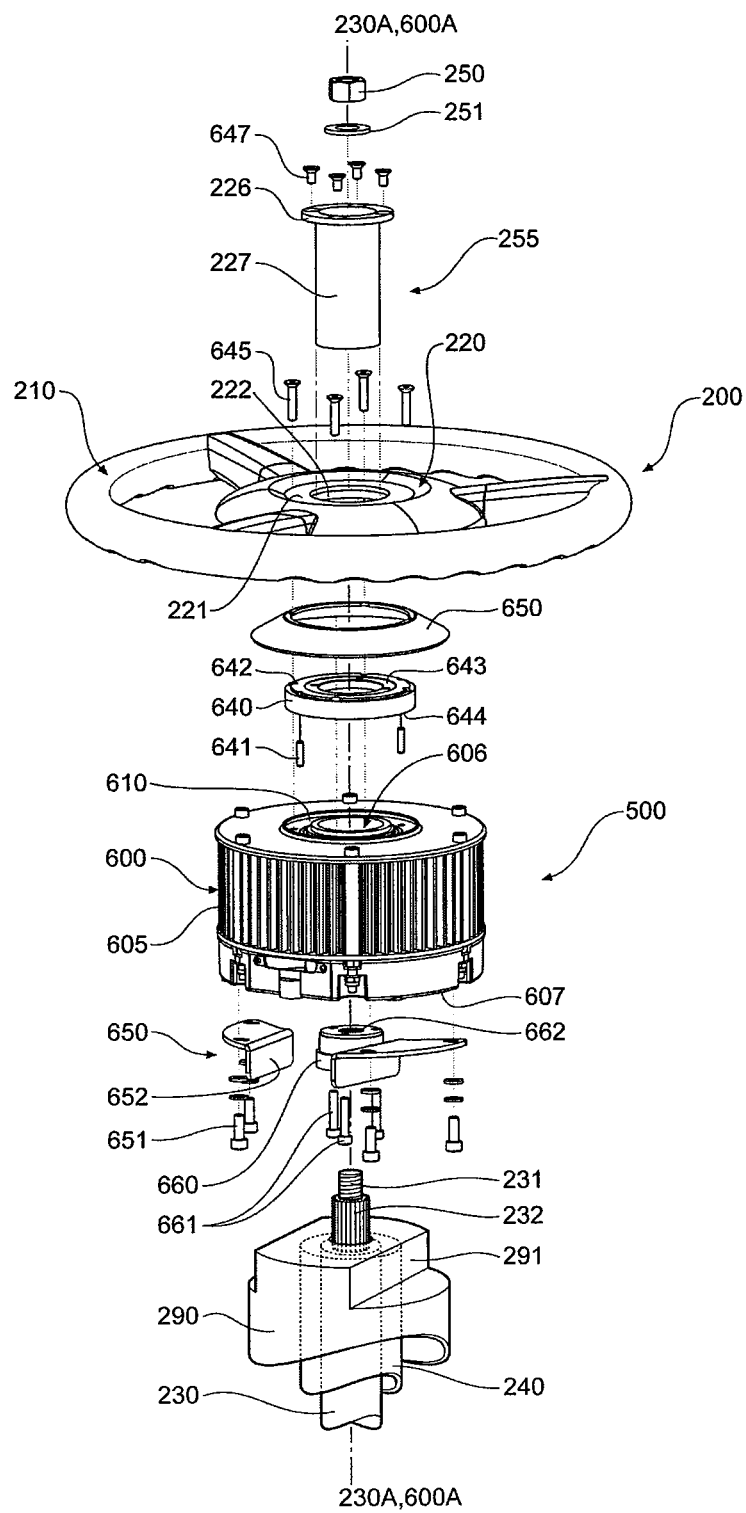
FIG. 3 is an exploded perspective view of a drive assembly forming in an illustrative embodiment a component of the vehicle guidance system illustrated in FIG. 1.

Referring now to FIG. 3, there is shown an exploded perspective view of a vehicle drive assembly 500 in accordance with a further illustrative embodiment. Drive assembly 500 once again drives the steering wheel assembly 200 of the vehicle which in this example consists of a steering wheel 210 having a centrally located hub 220 including a circular shaped aperture 222 forming an inner annular edge or rim region 221. Steering wheel assembly 200 further includes a core portion 255 incorporating a circularly shaped top flange 226 that seats within aperture 222 and a downwardly extending cylindrical sleeve portion 227.

The hub 220 (and hence steering wheel 210) is attached to core portion 255 by adaptor collar 640 where the annular outer region 642 of collar 640 is connected to the inner annular edge region 221 of hub 220 by connecting bolts 645 which further connect through to rotor element 610 of motor 600 which is described below and the inner annular region 643 of collar 640 is connected to the top flange 226 of removable core portion 255 by connecting bolts 647. Accordingly, turning of the steering wheel 210 will result in core portion 255 of hub 220 turning. In another illustrative embodiment, the hub 220 and core portion 255 are formed as an integral unit. In yet another illustrative embodiment, the hub 220 includes an inner spline surface which engages with a complementary spline surface located on the periphery of top flange 226 of core portion 255 to rotate core portion 255 on rotation of steering wheel 210.

In this illustrative embodiment, drive assembly 500 includes a motor 600 located immediately below the hub 220 of steering wheel 210. Motor 600 incorporates a cylindrical motor housing 605 having a centrally disposed cylindrically shaped bore or channel 606 that receives the cylindrical sleeve portion 227 of steering wheel assembly 200. Motor 600 further includes a rotor element 610 which in operation rotates around the centrally disposed cylindrically shaped channel 606 about a drive axis 600A defined by a centerline extending longitudinally along cylindrically shaped channel 606.

As described previously, rotor element 610 of motor 600 is connected to steering wheel assembly 200 by adaptor collar 640 and connecting bolts 645. Location dowels 641 extending between adaptor collar 640 and up into the bottom annular surface 644 further ensure concentricity between rotor element 610 and adaptor collar 640 and hence steering wheel assembly 200. Skirt seal or flexible washer 650 is seated between adaptor collar 640 and steering wheel 210 and functions to seal rotor element 610 from the external environment. Attached to the end of cylindrical sleeve portion 227 by connecting bolts 661 is a spline adaptor 660 for connecting the steering wheel assembly 200 incorporating the drive assembly 500 to the steering shaft 230.

Steering shaft 230 includes a threaded end portion 231 next to an intermediate spline portion 232 and rotates within steering column 240 about steering wheel axis 230A to operate the steering assembly of the vehicle. To install drive assembly 500, spline adaptor 660 having an internal spline surface 662 is seated on the complementary spline surface 232 of steering shaft 230 with threaded portion 231 of steering shaft 230 projecting through spline adaptor 660 up into cylindrical sleeve portion 227 of core portion 255 to allow attachment of steering wheel 210 by nut 250 and washer 251.

To complete installation, anti-rotation brackets 650 are attached to the base 607 of motor housing 605 by connecting bolt and washers 651. Anti-rotation brackets 650 each include opposed downwardly extending vertical abutment faces 652 which on installation seat against complementary wall portions 291 of shaft housing 290 to provide a steering reaction torque and prevent rotation of motor housing 605 and hence the stator of motor 600. As a result, operation of motor 600 results in a torque being generated by rotor element 610 to directly drive steering wheel 210 about drive axis 600A which is coaxial to steering wheel axis 230A.

While in this illustrative embodiment, anti-rotation brackets 650 abutting wall portions 291 of shaft housing 290 are employed to prevent movement of motor housing 605 it would be appreciated by those skilled in the art that other anti-rotation members or means that result in drive assembly 500 generating a torque about drive axis 600A are contemplated to be within the scope of the invention. Accordingly, motor housing 605 could be mounted to other fixed regions of the vehicle which function to provide a steering reaction torque and hence restrain movement of the motor housing 605 on operation of motor 600. In one non-limiting example, motor housing 605 includes an anti-rotation member or bracket mounted to the motor housing 605 and at the other end to the instrument console of the vehicle. In another example, motor housing 605 includes an anti-rotation member extending from the base 607 of motor housing 605 whose other end is mounted to the floor of the cabin of the vehicle.

In this illustrative embodiment, motor 600 is an axial flux brushless direct current (DC) motor having a constant torque capability from 0-100 RPM over an ambient temperature range of −30° C. to +60° C. In addition, motor 300 includes an intermittent over torque capability. The axial flux brushless motor provides high peak torque capabilities in a compact form factor suitable for inclusion as part of the steering wheel hub. This high peak torque capability provides for rapid acceleration of the steering wheel assembly 200 and hence allows rapid directional corrections when the vehicle is moving at higher speeds or when initially acquiring a predetermined trajectory.

While in this embodiment an axial flux brushless DC motor is employed, equally other types of motors may be used depending on the requirement. These include, but are not limited to axial or radial flux DC stepper motors, brushed DC motors, AC synchronous motors and AC induction motors.

As the vehicle guidance system 100 involves a drive assembly 130, 500 which directly drives the steering shaft 230 it is inherently more accurate than those systems which require a coupling or linking stage between a separate motor drive and the steering wheel 210 which will be prone to slippage and/or backlash. In addition, the drive assembly of the present system will reduce the part number count resulting in a more reliable system. Further the absence of any gear or chains in the drive train allows for totally silent operation reducing operator fatigue when used for long durations.

Figure 4:
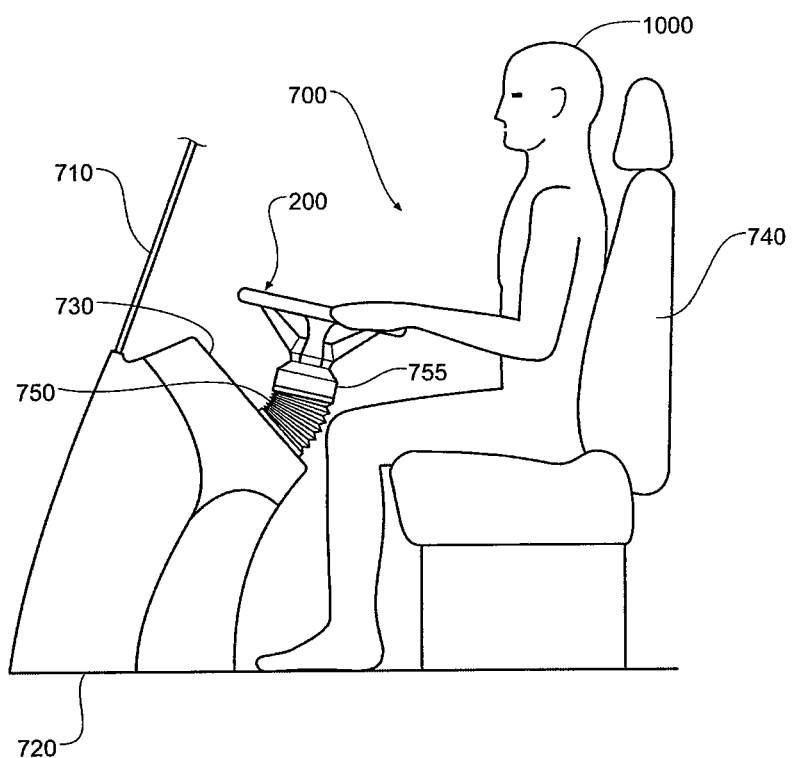
FIG. 4 is figurative view of the driver's cabin of a vehicle depicting a standard manually operable steering wheel assembly.
Figure 5:
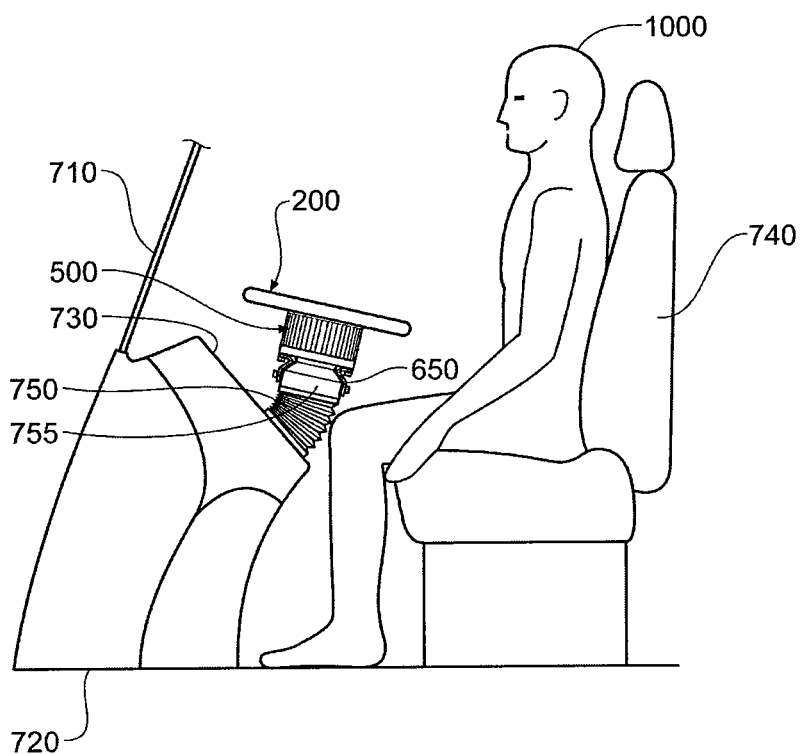
FIG. 5 is a figurative view of the driver's cabin illustrated in FIG. 4 including the drive assembly illustrated in FIG. 3.

Referring now to FIGS. 4 and 5, there are shown figurative views of a vehicle cabin 700 having a windscreen 710, a floor region 720, an instrument console 730 and a seat 740 upon which operator 1000 of the vehicle sits. Extending from the instrument console 730 is a steering shaft and column located within a flexible tubular housing 750 terminating in a frusto-conical shaped rigid mounting portion 755 upon which steering wheel assembly 200 is located. In this example, steering shaft incorporates an intermediate knuckle joint to present the steering wheel assembly 200 in a more vertical orientation to the operator 1000. In FIG. 4 there is shown the standard manually operable steering system whereas in FIG. 5 the same vehicle cabin 700 is shown but now including an installed vehicle guidance system incorporating a drive assembly 500 such as depicted in FIG. 3 including anti-rotation brackets bolted 650 to rigid mounting portion 755 to provide a steering reaction torque.

As would be immediately apparent to those skilled in the art, a vehicle guidance system in accordance with the present invention will minimally affect the operator environment where space is typically at a premium. In addition, and has been described previously all that is required to fit the drive assembly of the vehicle guidance system is to remove the original steering wheel from the steering wheel shaft and simply replace this with the steering wheel that incorporates the integrated drive assembly and then fit the anti-rotation brackets. As the steering wheel and drive assembly are integrated as a unit, the design of the steering wheel design may be customised to complement the associated drive assembly.

In one example of this customization, the inertial characteristics of the steering wheel are reduced so as to reduce the cost and size of the motor required for a desired level of steering accuracy. In addition, the motor controller can be tailored to the precise inertial load of the associated steering wheel, thereby increasing the accuracy of control. This is to be contrasted with prior art systems based on indirect actuation of the steering wheel assembly where the controller will have to take into account a wide range of steering wheels having varying inertial loads.

Figure 6:
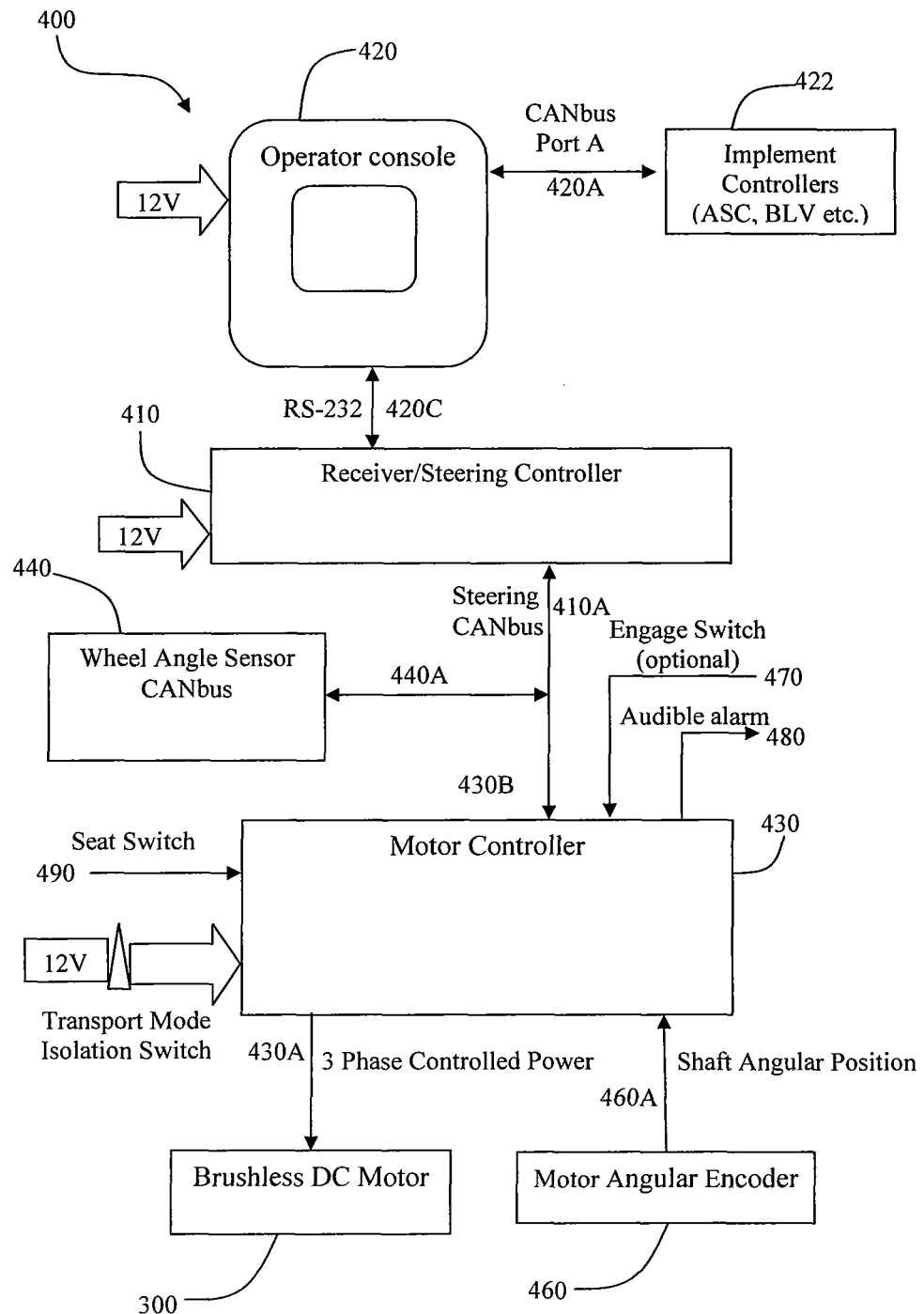
FIG. 6 is a system architecture diagram of a vehicle guidance system in accordance with an illustrative embodiment of the present invention.

Referring now to FIG. 6 there is shown a system architecture diagram of a vehicle guidance system 400 according to an illustrative embodiment. Vehicle guidance system 400 includes a combined receiver/steering controller 410 which functions both as a GNSS receiver and to generate steering control signals 410A for motor controller 430. As would be appreciated by those skilled in the art, the functionality of the GNSS receiver and steering controller may be implemented as separate modules within a vehicle guidance system allowing for separate replacement or upgrading of individual modules as required.

In this illustrative embodiment, receiver/steering controller 410 is a TOPCON AGI-3 receiver which is mounted on the roof of the vehicle cabin and contains a GNSS system which may include further optional accuracy enhancements including a differential GNSS modem to obtain error correction information from a base station, accelerometers for measuring local accelerations at the position of the GNSS antenna and gyroscopes and a compass to further aid in accurately determining the orientation of the vehicle. Receiver/steering controller 410 further includes the steering controller module incorporating a guidance computer which determines the steering control signal 410A.

In one illustrative mode of operation, the steering control signal functions to control the rate of change of the steering wheel angle at an update rate between 10 to 50 Hz based on the position information calculated from the GNSS system and the desired path. By inferring the steered wheel angles from measurement of the change in vehicle yaw (or trajectory) the control loop is closed and stable control can be realised. However, this measurement of yaw (or trajectory) is a delayed estimate of the current steered wheel angle and hence a delayed estimate of the direction which the vehicle will follow. As the steering wheel axis 230A and the drive axis (e.g. 300A, 600A) of the motor (e.g. 300, 600) of the present system are coaxial, a precise measurement can be made of the steering wheel angle from motor angular encoder 460 which measures the shaft angular position.

From this improved measurement of the steering wheel angle a higher speed closed loop control system can be approximated by inferring the steered wheel angle change from the steering wheel angle. This can be contrasted with prior art indirectly coupled vehicle guidance systems where any inferred measurement of the steering wheel angle will be limited by backlash due to the indirect coupling between the drive motor and the steering wheel.

In another illustrative mode of operation, the steering control signal outputs steering curvature commands corresponding to values of 1/R where R is the radius of the circle upon which the vehicle is taken to travel at any instant. In this mode of operation, wheel angle sensor 440 measures the turned wheel angle of the wheels of the vehicle to provide a feedback measurement to the control algorithm to allow it to calculate the required steering radius. By adding support for a direct and accurate measurement of the actual steered wheel angles, the estimation delays are removed allowing the controller to operate at a higher frequency and hence able to make more rapid corrections leading to a more accurate trajectory for a given vehicle speed or a higher vehicle speed while maintaining a given level of accuracy and stability.

This is to be contrasted with prior art systems based on indirect actuation of the steering wheel assembly where any potential increase in precision provided by closed loop control would be overwhelmed due to the inherent slippage and/or backlash involved in the indirect coupling of any drive motor to the steering wheel assembly.

The operator of vehicle guidance system 400 is able to set up the system via operator console 420. In this illustrative embodiment, operator console 420 is a TOPCON System 150 console which also provides a control interface for the controllers 422 of other precision agriculture applications such as auto-section control where individual flow controllers on a boom that is being towed by the vehicle can be individually controlled in accordance with the path of the vehicle and boom levelling. Control signal 420A is sent (and received) to controllers 422 utilising the vehicle's controller area network (CANbus) which is a standardised vehicle bus interface for linking various electronic control units of a vehicle.

In this illustrative embodiment, operator console 420 is connected to receiver/controller 410 by RS232 interface 420C. As would be appreciated by those skilled in the art, other communication protocols and interfaces including but not limited to CANbus or Ethernet using TCP/IP may also be employed. Receiver/controller 410 generates steering control signal 410A for motor controller 430. Motor controller 430 in this illustrative embodiment then interprets the steering control signal 410A depending on the mode of operation.

As described previously, in one mode the steering control signal 410A is in the form of a rate of change of steering angle. This is then converted to a corresponding steering wheel angular speed which is converted to low level 3 phase power control commands 430A to control motor 300. In a second mode, the steering control signal is converted to a steering wheel absolute angle which is converted to low level 3 phase power control commands 430A to control motor 300. In a third mode having even higher speed and accuracy of control, the steering control signal 410A is in the form of instantaneous steering curvature (i.e. 1/R) commands which once again are converted to a corresponding steering wheel angular speed or a steering wheel absolute angle which in turn is converted to low level 3 phase power control commands 430A to control motor 300. In this mode, the optional wheel angle sensor 440 is used to detect the actual steered wheel angle to generate a steered wheel angle signal 440A which is sent to the receiver/steering controller 410 over the steering component of the CANbus to be used as a correction factor in the generation of the steering control signal 410A. In another embodiment, the steered wheel angle signal 440A is sent to motor controller 430 either over the CANbus or by direct input.

In another illustrative embodiment, motor controller 430 also receives data from receiver/steering controller 410 about the geometry of the guided vehicle to calculate the required steering wheel angle change to generate the 1/R trajectory change of vehicle. Motor controller 430 also receives parameters such as maximum torque, maximum RPM and also maximum wheel angle from straight ahead which is updated periodically. Optimum values for these parameters may vary between vehicles. These values may be automatically stored in non-volatile memory in operator console 420 to allow easy and rapid setup when moving the vehicle guidance system 400 between vehicles.

Motor controller 430 generates 3 phase controlled power command 430A to drive motor 300 in accordance with steering control signal 410A which is received via a CANbus communications link. This link also allows the motor controller 430 to send motor status parameters such as torque, temperature or error conditions back to the receiver/steering controller 410 (see Table 2 below). Motor controller 430 also receives the shaft angular position 460A from an angular position sensor or motor angular encoder 460 connected to the shaft or rotor of the motor 300.

In this illustrative embodiment, motor angular encoder 460 measures the angular position of the motor rotor with respect to the motor housing with a resolution of 12 bits over a 360° rotation with monotonic output over the full rotation and accuracy of 0.05% over the full working temperature range.

As discussed previously, this arrangement facilitates the accurate measurement of the steering wheel angle.

The communications link between motor controller 430 and receiver/steering controller 410 allows a range of configuration, status and parameter messages to be sent and received between the two components. In terms of configurable parameters, the non exhaustive list of messages set out in Table 1 may be sent and received.

Configuration Messages

TABLE 1

| SET MESSAGE | READ MESSAGE | UNITS AND/OR RANGE |
| --- | --- | --- |
| Set maximum torque | Read back maximum torque | 0 to 100% |
| Drive to defined motor angle | Read back motor angle | Encoder Units |
| Drive to defined steered wheel angle | Read back steered wheel angle | Wheel angle sensor units |
| Drive vehicle to curve of 1/R | Read back vehicle trajectory curve | 1/R (metres$^{-1}$) |
| Set maximum angular velocity | Read back maximum angular velocity | Encoder units per second |
| Set error band | Read back error band | Encoder units |
| Set straight ahead | Read back straight ahead setting | Encoder units |
| Set maximum allowable steered wheel angle from straight ahead | Read back maximum allowable steering wheel angle from straight ahead | Wheel angle sensor units |
| Set thermal cut out temperature | Read back thermal cut out temperature | ° C. |
| Set hysteresis for thermal cut out temperature | Read back hysteresis for thermal cut out temperature | ° C. |
| Set temperature at which controller issues imminent over temperature message | Read back temperature at which controller issues imminent over temperature message | ° C. |
| Set maximum steering wheel rotation clockwise | Read back maximum rotation clockwise | Encoder units |
| Set maximum steering wheel rotation anti-clockwise | Read back maximum rotation anti-clockwise | Encoder units |

In terms of status messages, in this illustrative embodiment there are two types of messages. The first type is those solely instigated by the motor controller 430 and the second type of messages are those sent by the motor controller 430 in response to a query from the receiver/steering controller 410. A non exhaustive list of these messages is set out in Table 2.

TABLE 2

| MESSAGE TYPE | MESSAGE |
| --- | --- |
| Automatic send | Read back actual position (Encoder units) |
| | Read back curve setting (1/turn radius in m-$^1$) |
| | Temperature close to cutoff value and max torque reduced |
| | Temperature above cutoff value and controller disabled |
| | Temperature sufficiently below cutoff value and controller re-enabled |
| Query response | Read back actual temperature (motor, ° C.) |
| | Read back ambient temperature (° C.) |

Motor controller interface 430 also incorporates a number of further input/outputs including seat switch 490, engage switch 470 and an audible alarm 480. Seat switch 490 detects the presence of an operator of the vehicle. If the operator is absent for greater than a predetermined or user definable time then motor controller 430 will disengage the automatic steering mode. Re-engagement of automatic steering mode would then require the operator's presence to be re-established and the operator to press the resume button (soft-key or switch if fitted) and for all other conditions for automatic steering mode to be met.

Engage switch 470 is an optional separate hardware switch independent to the software control switch provided on operator console 420 which allows the operator to engage or disengage automatic steering mode. This would normally be done at the beginning and end of each line that a vehicle traverses to conduct a U-turn. Typically this switch would be mounted into the vehicle console or in a housing attached to the armrest of the vehicle. In another embodiment, vehicle guidance system 400 controls the vehicle through a U-turn at the same time exercising control of the vehicle speed and raising and lowering the towed implement if necessary. In modern farm machinery such controls may be readily implemented by appropriate messaging over the vehicles engine control and implement control CANbus networks. Audible alarm 480 is provided to alert the operator that vehicle guidance system 400 is operating outside of normal performance range.

In operation, an operator will engage automatic steering mode via the visual display interface of operator console 420. This generates a request to receiver/steering controller 410 to send an engage command to motor controller 430. An indicator on the operator console will indicate that power is available to motor controller 430 which will commence to drive motor 300 and hence the steering wheel to steer the vehicle in accordance with the programmed path. Similarly, automatic steering mode may be disengaged via operator console 420.

The present system also provides for an intuitive means of operator override or disengagement of the vehicle guidance system which disengages the automatic steering mode whenever the operator of the vehicle attempts to turn the steering wheel. As the steering axis 230A of the steering assembly and the drive axis 300A of the motor 300 are common this allows for direct monitoring or measuring of any torque applied by the operator to the steering wheel by monitoring the operating characteristics of motor 300. In particular, the motor torque is directly proportional to the motor current making monitoring of the motor torque straightforward.

In this manner, a difference measure can be determined between the actual value of a monitored performance parameter of the drive assembly as compared to the prescribed value that has been commanded. Accordingly, as a safety precaution, automatic steering mode will automatically disengage if one or more of a number of error conditions relating to determined difference measures are present. These include, but are not limited to:

the difference from the prescribed motor speed and the actual or monitored motor speed is exceeded by more than preset "max_speed_error" for more than "max_error_duration";

there occurs a difference in the monitored direction of rotation of the motor from the prescribed direction that the controller has been commanding;

the monitored driving or holding torque exceeds a prescribed maximum torque setting for more than preset "max-torque time";

the difference from prescribed motor position (encoder units) and monitored motor position is exceeded by more than preset "max steering error" for more than preset "max_error_duration";

the difference from prescribed steered wheel angle position (wheel angle sensor units) and monitored wheel angle position is exceeded by more than preset "max wheel angle error" for more than preset "max wheel angle error duration"

the monitored acceleration of the motor/steering wheel is in a direction opposite to the direction that the motor is commanded to apply torque;

the monitored track error (position of vehicle with respect to planned path) stays beyond preset maximum for a predetermined time; and the monitored motor temperature is outside of normal operating range.

If any of the above error conditions are met, motor controller 430 generates a disengage warning signal 430B to receiver/steering controller 410 to disengage automatic steering mode.

In another illustrative embodiment, a combination of two or more of the above error conditions are weighted and combined to form a weighted error value which will generate a disengage warning signal 430B when it exceeds a predetermined value. In this manner, the weighted error value can be tuned by modifying the weighting coefficients to take into account steering dynamics and operator behaviour. In yet another illustrative embodiment, the degree of difference between the commanded and monitored values is taken into account when determining the error condition. As an example, where the prescribed or commanded motor speed is 50% above the "max_speed_error" then the "max_error_duration" would be suitably reduced.

Advantageously, when the automatic steering mode is disengaged whether manually or automatically, the operator will be able to manually operate the steering wheel 210 (as in FIG. 4) in a similar manner to standard operation of the vehicle as motor 300 will provide no discernable extra resistance torque to the turning of the steering wheel 210 by the operator unlike many prior art arrangements where the operator will need to manually disengage the drive mechanism of the vehicle guidance system from the steering wheel before continuing to operate the vehicle.

In the illustrative embodiments described herein, the stator element of the electric motor 300 is of an ironless design resulting in zero torque being exerted on the steering shaft (and hence the steering wheel) when power is removed from the motor 300. In this manner, the operator's experience on operating the steering wheel when the vehicle guidance system is disengaged will be identical to that experienced when no drive assembly is fitted.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

It will be understood that the term "comprise" and any of its derivatives (e.g. comprises, comprising) as used in this specification is to be taken to be inclusive of features to which it refers, and is not meant to exclude the presence of any additional features unless otherwise stated or implied.

The reference to any prior art in this specification is not, and should not be taken as, an acknowledgement of any form of suggestion that such prior art forms part of the common general knowledge.

Although illustrative embodiments have been described in the foregoing detailed description, it will be understood that the invention is not limited to the embodiments disclosed, but is capable of numerous rearrangements, modifications and substitutions without departing from the scope of the invention as set forth and defined by the following claims.

The invention claimed is:

1. A method of disengaging a drive assembly in a vehicle guidance system, the vehicle guidance system having a steering controller and a motor controller, and the vehicle guidance system operable on a steering wheel assembly including a steering wheel and a hub, the hub connected to a steering shaft rotatable about a steering wheel axis within a steering column for steering the vehicle and the drive assembly operable to generate a torque about a drive axis to rotate the steering wheel assembly, wherein the drive axis of the drive assembly is coaxial to the steering wheel axis, the method including the steps of:

commanding, using a signal from the steering controller, the drive assembly to achieve a prescribed value of a performance parameter;

monitoring, by the motor controller, the drive assembly to determine an actual value of the performance parameter;

determining a difference measure between the prescribed value and the actual value and disengaging, using a signal from the motor controller, the drive assembly based on the difference measure.

2. The method of disengaging a drive assembly as claimed in claim 1, wherein the drive assembly includes an electric motor.

3. The method of disengaging a drive assembly as claimed in claim 2, wherein the performance parameter is electric motor speed.

4. The method of disengaging a drive assembly as claimed in claim 2, wherein the performance parameter is a direction of rotation of the electric motor.

5. The method of disengaging a drive assembly as claimed in claim 2, wherein the performance parameter is electric motor torque.

6. The method of disengaging a drive assembly as claimed in claim 2, wherein the performance parameter is electric motor position.

7. The method of disengaging a drive assembly as claimed in claim 2, wherein the performance parameter is steered wheel angle position.

8. The method of disengaging a drive assembly as claimed in claim 2, wherein the performance parameter is the position of the vehicle.

9. The method of disengaging a drive assembly as claimed in claim 2, wherein the commanded performance parameter and the monitored performance parameter are different.

10. The method of disengaging a drive assembly as claimed in claim 9, wherein the commanded performance parameter is a direction of applied torque and the monitored performance parameter is an acceleration of the electric motor.

11. The method of disengaging a drive assembly as claimed in claim 1, wherein the difference measure is evaluated over a predetermined time period.

\* \* \* \* \*